United States Patent
Romani de Oliveira

(10) Patent No.: US 9,928,131 B2
(45) Date of Patent: Mar. 27, 2018

(54) SYSTEM AND METHOD FOR DETECTION OF RARE FAILURE EVENTS

(71) Applicant: General Electric Company, Schenectady, NY (US)

(72) Inventor: Italo Romani de Oliveira, Rio de Janeiro (BR)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 124 days.

(21) Appl. No.: 14/972,162

(22) Filed: Dec. 17, 2015

(65) Prior Publication Data

US 2017/0177426 A1 Jun. 22, 2017

(51) Int. Cl.
*G06F 11/00* (2006.01)
*G06F 11/07* (2006.01)
*G06F 17/13* (2006.01)

(52) U.S. Cl.
CPC ........ *G06F 11/079* (2013.01); *G06F 11/0709* (2013.01); *G06F 11/0751* (2013.01); *G06F 17/13* (2013.01)

(58) Field of Classification Search
CPC ............... G06F 11/0709; G06F 11/079; G06F 11/0751; G06F 11/2257; G06F 11/2263; G06F 11/3058; G06F 17/13
USPC ....................... 714/37, 25, 36, 33, 47.1, 47.3
See application file for complete search history.

(56) References Cited

U.S. PATENT DOCUMENTS

| | | |
|---|---|---|
| 5,926,402 A | 7/1999 | Tatsuta et al. |
| 7,243,320 B2 | 7/2007 | Chiu et al. |
| 7,952,583 B2 | 5/2011 | Waechter et al. |
| 8,041,509 B2 | 10/2011 | Alfano |
| 8,155,938 B2 | 4/2012 | Singhee et al. |

(Continued)

FOREIGN PATENT DOCUMENTS

WO 2013006804 A1 1/2013

OTHER PUBLICATIONS

Kanj et al., "Mixture importance sampling and its application to the analysis of SRAM designs in the presence of rare failure events", DAC '06 Proceedings of the 43rd annual Design Automation Conference, pp. 69-72, 2006.

(Continued)

*Primary Examiner* — Joseph D Manoskey
(74) *Attorney, Agent, or Firm* — Pabitra K. Chakrabarti

(57) ABSTRACT

A method includes generating a system model representative of a socio-technical system having a plurality of system parameters. The method further includes selecting one or more essential system parameters from the plurality of system parameters. The method also includes determining a plurality of probability distributions corresponding to the one or more essential system parameters. The method further includes determining at least one hyperbox using a sampling optimization technique based on the one or more essential system parameters. The at least one hyperbox is representative of a confidence region corresponding to a rare event of the socio-technical system. The method also includes determining a probability of the rare event using a variance reduction technique based on a plurality of particles obtained from the at least one hyperbox. The probability of the rare event is representative of a performance of the socio-technical system.

19 Claims, 7 Drawing Sheets

(56) References Cited

U.S. PATENT DOCUMENTS

| | | | |
|---|---|---|---|
| 8,365,118 | B2 | 1/2013 | Joshi et al. |
| 9,460,243 | B2* | 10/2016 | Joshi .................. G06F 17/5009 |
| 2005/0071123 | A1* | 3/2005 | Kouritzin ............. G05B 13/021 702/181 |
| 2006/0015325 | A1 | 1/2006 | Moore |
| 2010/0076917 | A1 | 3/2010 | Petit |
| 2010/0114526 | A1 | 5/2010 | Hosking |
| 2011/0178963 | A1* | 7/2011 | Hartman ............ G05B 23/0221 706/12 |
| 2013/0226544 | A1* | 8/2013 | Mcconaghy ........ G06F 17/5022 703/2 |
| 2016/0364507 | A1* | 12/2016 | Dupuis ............... G06F 17/5009 |

OTHER PUBLICATIONS

Hua et al., "Extracting Rare Failure Events in Composite System Reliability Evaluation via Subset Simulation", IEEE Transactions on Power Systems, pp. 753-762, vol. 30, Issue 2, 2015.

Roh et al., "Stochastic parameter search for events", BMC Systems Biology, vol. 8, Issue 126, 17 Pages, 2014.

Jones et al., "Lipschitzian optimization without the Lipschitz constant", Journal of Optimization Theory and Application, vol. 79, Issue 1, pp. 157-181, 1993.

"Flying qualities of piloted aircraft", D. o. Defense. MIL-HDBK-1797., 717 Pages, 1997.

Zhou et al., "Confidence intervals for the log-normal mean", vol. 16, Issue 7, pp. 783-790, 1997.

Blom et al., "Accident risk assessment for advanced ATM", 2nd USA / Europe Air Traffic Management R&D Seminar. Orlando, FL, USA, FAA / EUROCONTROL., 1998.

Kuchar et al., "A Review of Conflict Detection and Resolution Modeling Methods", IEEE Transactions on Intelligent Transportation Systems, vol. 1, Issue 4, pp. 179-189, Dec. 2000.

Blom et al., "Stochastic analysis background of accident risk assessment for Air Traffic Management", HYBRIDGE Project, European Commisssion, National Aerospace Laboratory, NLR, 42 Pages, 2003.

Krystul et al., "Stochastic Differential Equations on Hybrid State Spaces. Stochastic Hybrid Systems", C. G. Cassandras and J. Lygeros, Taylor & Francis CRC Press, pp. 15-46, 2006.

Beyen et al., "Aircraft Autolander Safety Analysis Trhough Optimal Control-Based Reach Set Computation", Journal of Guidance, Control, and Dynamics, vol. 30, Issue 1, pp. 68-77, Jan.-Feb. 2007.

Johnson, "NLopt AbInitio", Main page downloaded from :<http://ab-initio.mit.edu/wiki/index.php/NLopt> on Jan. 25, 2016.

Blom et al., "Rare event estimation for a large stochastic hybrid system with air traffic application", Stochastic Hybrid System, Chapter 9, pp. 193-214, 2009.

Blom et al.,"Final Report on Accident Risk Assessment of the A3 operation", TREN/07/FP6AE/S07.71574/037180IFLY, 84 Pages, 2011.

Prandini et al., "Air traffic complexity and the interacting particle system method: An integrated approach for collision risk estimation", American Control Conference (ACC) IEEE: 2154-2159, 2011.

Cerou et al., "Sequential Monte Carlo for rare event estimation", Statistics and Computing, vol. 22, Issue 3, pp. 795-808, 2012.

Stroeve et al., "Contrasting safety assessments of a runway incursion scenario: Event sequence analysis versus multi-agent dynamic risk modelling", Reliability Engineering & System Safety, vol. 109, Issue 17, pp. 133-149, 2013.

Butler et al., "Efficient optimization of the likelihood function in Gaussian process modelling", Comput. Stat. Data Anal. ISSN 0167-9473, vol. 73, pp. 40-52, 2014.

Moral, "Feynman-Kac Formulae—Genealogical and Interacting Particle Systems with Applications", Springer., 100 Pages, 2004. (Part A-REF 7).

Moral, "Feynman-Kac Formulae—Genealogical and Interacting Particle Systems with Applications", Springer., 100 Pages, 2004. (Part 6-REF 7).

Moral, "Feynman-Kac Formulae—Genealogical and Interacting Particle Systems with Applications", Springer., 100 Pages, 2004. (Part C-REF 7 ).

Moral, "Feynman-Kac Formulae—Genealogical and Interacting Particle Systems with Applications", Springer., 100 Pages, 2004. (Part D-REF 7 ).

Moral, "Feynman-Kac Formulae—Genealogical and Interacting Particle Systems with Applications", Springer., 100 Pages, 2004. (Part E-REF 7 ).

Moral, "Feynman-Kac Formulae—Genealogical and Interacting Particle Systems with Applications", Springer., 67 Pages, 2004. (Part F-REF 7 ).

* cited by examiner

SYSTEM AND METHOD FOR DETECTION OF RARE FAILURE EVENTS

BACKGROUND

Embodiments of the present specification relate to detection of rare failure events, and more particularly to optimized systems and methods for determining a rare failure event in complex socio-technical systems.

Heterogeneous engineering systems having both technical infrastructure such as hardware and social infrastructure such as agents and institutions are generally referred to as socio-technical systems. By way of example, heterogeneous systems such as aircraft management systems and power network management systems include a close interplay of diverse technical artifacts and social artifacts. An air traffic management system includes artifacts such as a luggage handling system, a runway, a control center, an airplane, and a passenger booking system. Similarly, a power network management system includes a distributed physical network, power generation systems, and social organizations such as power trading entities. Management of socio-technical systems requires efficient modelling of both the technical artifacts and social artifacts. The design methodology for these socio-technical systems requires a rigorous performance analysis approach based on such models. A failure probability measure is an important parameter representative of an overall performance of the socio-technical systems.

Multi-agent dynamic risk models (MA-DRMs) have been successfully used in the analysis of complex socio-technical systems such as a fleet of aircrafts operated by a group of pilots. In particular, the MA-DRMs have been used to determine a probability of failure events in the complex socio-technical systems. Typically, failure in a critical complex socio-technical system is a rare event having a measure of one in a billion or more opportunities. Traditionally, simulation techniques such as Monte Carlo methods have been used for estimating failure and accident rates. However, the computational complexity of the conventional simulation methods for analyzing socio-technical systems is very high. Sequential Monte Carlo methods that entail use of simulation based optimization techniques are performed in an iterative manner to reduce the computational complexity. The sequential Monte Carlo methods applied to a Markov process have enhanced capability of detecting of rare events. However, these methods may degenerate after a few successive re-sampling steps. Degeneration is manifested in high variance, lack of diversity or in failure to obtain the desired event.

BRIEF DESCRIPTION

In accordance with an aspect of present specification, a method is disclosed. The method includes generating, via a model generator unit, a system model representative of a socio-technical system having a plurality of system parameters. The method further includes selecting, via the model generator unit, one or more essential system parameters from the plurality of system parameters. The method also includes determining, via the model generator unit, a plurality of probability distributions corresponding to the one or more essential system parameters. The method further includes determining, via the event detector unit, at least one hyperbox using a sampling optimization technique based on the one or more essential system parameters. The at least one hyperbox is representative of a confidence region corresponding to a rare event of the socio-technical system. The method also includes determining, via the event detector unit, a probability of the rare event using a variance reduction technique based on a plurality of particles obtained from the at least one hyperbox. The probability of the rare event is representative of a performance of the socio-technical system.

In accordance with another aspect of the specification, a rare event detection system is disclosed. The system includes a model generator unit configured to generate a system model representative of a socio-technical system. The system model comprises a plurality of system parameters. The model generator is further configured to select one or more essential system parameters from the plurality of system parameters. The model generator is also configured to determine a plurality of probability distributions corresponding to the one or more essential system parameters. The system further includes an event detector unit communicatively coupled to the model generator unit and configured to determine at least one hyperbox using a sampling optimization technique based on the one or more essential system parameters. The hyperbox is representative of a confidence region corresponding to a rare event of the socio-technical system. The event detector is further configured to determine a probability of the rare event using a variance reduction technique based on a plurality of particles obtained from the at least one hyperbox. The probability of a rare event is statistically significant and is representative of a performance of the socio-technical system.

In accordance with another aspect of the present specification, a non-transitory computer readable medium that stores instructions executable by one or more processors to perform a method for detecting a rare event is disclosed. The instructions executable by one or more processors generate a system model representative of a socio-technical system, having a plurality of system parameters. Further, the instructions executable by one or more processors select one or more essential system parameters from the plurality of system parameters. In addition, the instructions executable by one or more processors determine a plurality of probability distributions corresponding to the one or more essential system parameters. The instructions executable by one or more processors determine at least one hyperbox using a sampling optimization technique based on the one or more essential system parameters. The at least one hyperbox is representative of a confidence region corresponding to a rare event of the socio-technical system. In addition, the instructions executable by one or more processors determine a probability of the rare event using a variance reduction technique based on a plurality of particles obtained from the at least one hyperbox, wherein the probability of a rare event is statistically significant and representative of performance of the socio-technical system.

DRAWINGS

These and other features and aspects of embodiments of the present invention will become better understood when the following detailed description is read with reference to the accompanying drawings in which like characters represent like parts throughout the drawings, wherein.

DETAILED DESCRIPTION

Figure 1:
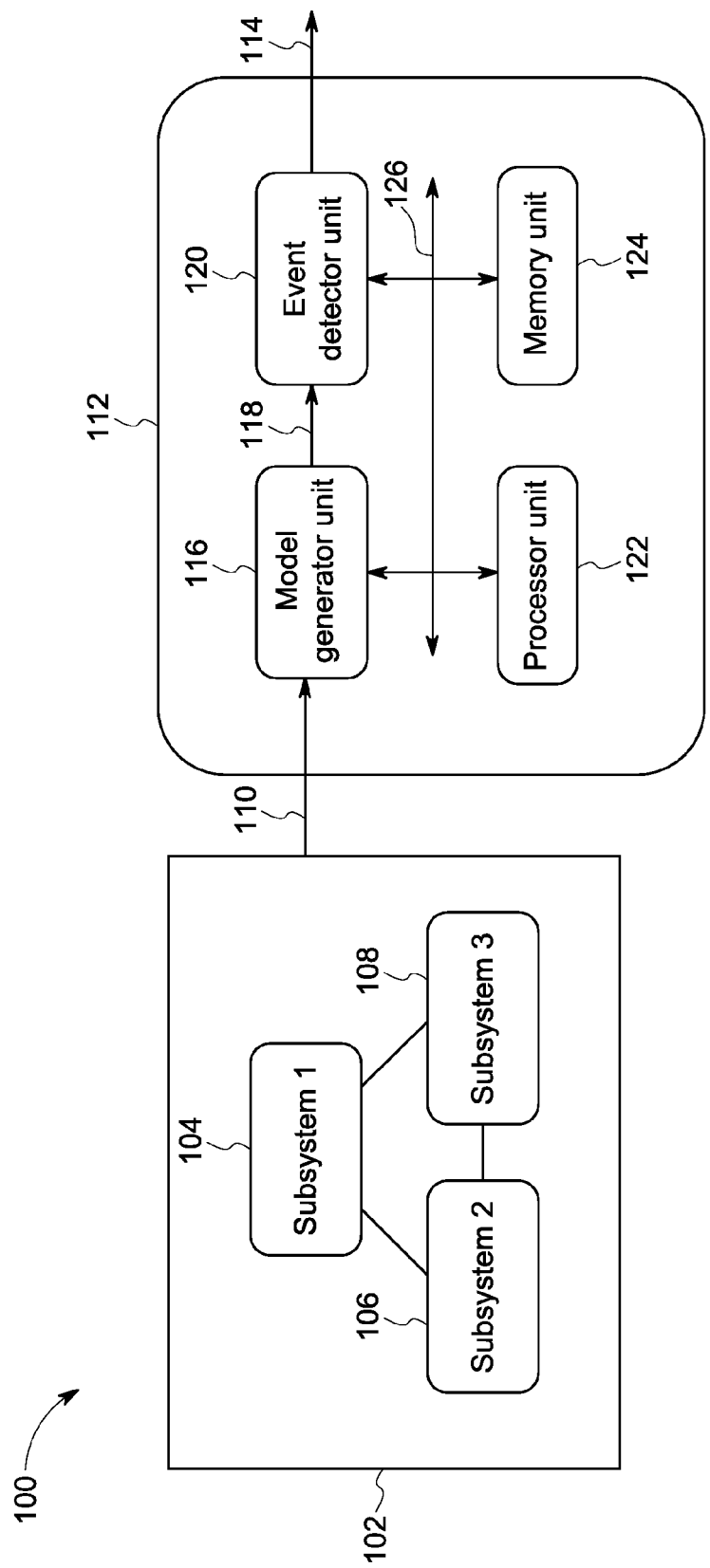
FIG. 1 is a diagrammatic illustration of a system for detecting a rare event in a socio-technical system, in accordance with aspects of the present specification.

As will be described in detail hereinafter, systems and methods for detecting a rare failure event are presented. More particularly, the systems and methods are configured to facilitate optimized detection of a rare failure event in complex socio-technical systems. Use of the exemplary systems and methods presented hereinafter provides enhanced operation of the socio-technical systems in a cost effective manner.

The term 'socio-technical system' as used herein refers to a complex stochastic system having human and technological components. The term 'system model' refers to a model representative of a socio-technical system having a plurality of system parameters. The term 'multi-agent dynamic risk model' refers to a system model used for estimating risk or failure of a socio-technical system. The terms 'rare event', and 'rare failure event' are used equivalently and interchangeably to refer to an event having a very low probability value such as a failure event during operation of the socio-technical system. The term 'probability of the rare event' refers to a probability of occurrence of the rare event during the operation of the socio-technical system. The probability of the rare event is an example of a performance measure of the socio-technical system and is indicative of frequency of occurrence of a rare event such as accident of an aircraft.

The socio-technical system may be mathematically represented as a sequence of probabilistic distributions having Markov property and indexed by discrete time. Such systems are referred to as an 'interacting particle system' (IPS). Future states of probability distributions having the Markov property depend only on the present state. The socio-technical system is in general a hybrid system including both discrete and continuous subsystems. The terms 'particle filtering' and 'sequential Monte Carlo' are used equivalently and interchangeably to refer to an IPS technique used for simulating stochastic filtering and estimating stochastic parameters associated with the IPS technique. The term 'stochastic filtering' generally refers to estimating a conditional probability distribution of a process representative of the socio-technical system. The term 'particle' refers to a sample from a hyperbox used in the IPS technique or in another estimation method based on Monte Carlo simulation.

The term 'hyperbox' refers to a region in an n-dimensional space having a plurality of events of the socio-technical system. The term 'confidence region' refers to a confidence interval in the n-dimensional space corresponding to the rare event. The term 'global optimum' or 'optimum' is used to refer to a point in the n-dimensional space representative of a rare event of the socio-technical system. The term 'parameter space' used herein refers to a space determined by a plurality of system parameters. The term 'search space' used herein generally refers to a subspace of the parameter space determined by one or more essential parameters. The term 'target region' is used to refer to a hyperbox or a confidence region having a point representative of a rare event.

As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit, and other programmable circuits, and these terms are used interchangeably herein. In the embodiments described herein, memory may include, but is not limited to, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable, and include any computer program stored in memory for execution by personal computers, workstations, clients and servers. Also, as used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

FIG. 1 is a diagrammatic illustration of a system for detecting a rare event in a in a socio-technical system. More particularly, the system 100 is representative of a performance analyzing system for evaluating performance of a socio-technical system 102, in accordance with aspects of the present specification. It may be noted that the terms 'system for detecting a rare event' and 'performance analyzing system' may be used equivalently and interchangeably.

The socio-technical system 102 includes a plurality of subsystem units 104, 106, 108 and a plurality of human elements (not shown) interacting with one or more of the plurality of subsystems or subsystem units 104, 106, 108. The socio-technical system 102 includes a plurality of system parameters. In the example of FIG. 1, the socio-technical system 102 is representative of operation of a transport aircraft in a particular environment. In the same example, a rare event associated with the operation of the aircraft is an accident event and a performance measure is a probability of occurrence of an accident of the aircraft. Accordingly, in one example, the plurality of subsystems of the socio-technical system 102 may include an environmental subsystem 104, an aircraft subsystem 106, and a pilot subsystem 108. In this example, the aircraft subsystem 106 is operated by the pilot subsystem 108, which in turn has human elements in a desired context specified by the environmental subsystem 104. In another embodiment, the socio-technical system 102 may be representative of the operation of a fleet of machines or assets by a plurality of operators, where the fleet of machines operates co-operatively with the help of interacting processes that are followed by the plurality of operators. The assets can be industrial assets, such as, but not limited to, wind turbines, appliances, or locomotives. In the wind turbine example, a windfarm includes numerous wind turbines that may operate independently of one another. However, optimal performance of the windfarm is achieved by having the wind turbines work together.

Further, the performance analyzing system 100 includes a rare event detection system 112 that is configured to detect a rare event in the socio-technical system 102. In particular, the rare event detection system 112 is communicatively coupled to the socio-technical system 102 and configured to receive a plurality of measurement parameters 110 generated by the socio-technical system 102. Also, the rare event detection system 112 is configured to determine a performance measure such as a probability of occurrence of a rare failure event 114. The performance measure may be representative of a dependability of the socio-technical system 102. In a presently contemplated configuration, the rare event detection system 112 includes a model generator unit 116, an event detector unit 120, a processor unit 122, and a memory unit 124 communicatively coupled with each other via a communication bus 126. It may be noted that although the embodiment of FIG. 1 depicts the various elements of the rare event detection system 112 as separate units that are communicatively coupled to one another, in certain other examples, some or all of the units may be integrated with one or more of the other units in the rare event detection subsystem 112.

The model generator unit 116 receives the plurality of system parameters from the socio-technical system 102 and generates a system model such as a multi-agent dynamic risk model (MA-DRM) 118. The MA-DRM 118 models each subsystem unit of the socio-technical system 102 as a combination of technical artifacts interacting with one or more social agents. As used herein, the term 'technical artifact' refers to a hardware element or physical infrastructure. The term 'agent' as used herein refers to an intelligent entity such as human beings and computer processors, social entities such as an organization and processes, and the like. The MA-DRM 118 in one example is a self-contained model and may be deterministic or probabilistic in nature. In addition, the MA-DRM 118 also models system dynamics, contextual conditions, and system variability of the socio-technical system 102.

Further, the event detector unit 120 is communicatively coupled to the model generator unit 116 and configured to determine the performance measure 114 corresponding to the socio-technical system 102. In the embodiment where the socio-technical system 102 is representative of operating an aircraft, the rare failure event may correspond to failure of the aircraft during the flight leading to an accident or other rare events. In one example, the performance measure 114 may be a probability of failure of the aircraft. In another embodiment where the socio-technical system is a market place, the performance measure 114 may be a risk probability measure corresponding to a scenario modelling.

Moreover, in one embodiment, the event detector unit 120 models the rare failure event as a point in a search space representative of possible events generated by the socio-technical system 102. The event detector unit 120 is configured to determine a sub-region having a point representative of the rare failure event using an optimization technique. Further, the event detector unit 120 is configured to determine the rare event using a stochastic filtering of the Interacting Particle System (IPS) associated with the sub-region. In one embodiment, the sub-region is determined based on Lipschitzian optimization technique. Furthermore, in certain embodiments, an IPS technique such as a sequential Monte Carlo simulation technique is used in the sub-region to determine the performance measure of the socio-technical system 102.

In one embodiment, the model generator unit 116 is configured to select one or more essential system parameters from the plurality of system parameters. Further, the model generator unit 116 is configured to determine a plurality of probability distributions corresponding to the one or more essential system parameters. Some examples of the essential system parameters include, but are not limited to, an altitude measurement error $\epsilon_a$, time elapsed before fault detection $t_r$, wind direction $w_\theta$ and wind intensity $w_p$.

The event detector unit 120 is configured to determine at least one hyperbox within the search space using a sampling optimization technique based on the one or more essential system parameters. The hyperbox is representative of a confidence region corresponding to a rare event of the socio-technical system 102. The event detector unit 120 is further configured to determine a probability of the rare event using a variance reduction technique based on a plurality of particles obtained from the hyperbox. The event detector unit 120 is configured to determine a statistically significant value of the probability of the rare event with reference to a pre-determined significance level. The probability of the rare event is representative of the performance of the socio-technical system 102. Moreover, the probability of the rare event is either used to verify statutory requirements of the system design or to modify the socio-technical system for performance improvement.

The processor unit 122 is communicatively coupled to the communication bus 126 and may include at least one of an arithmetic logic unit, a microprocessor, a general purpose controller, and a processor array to perform the desired computations or run the computer programs and software routines. In one embodiment, the processor unit 122 may be configured to aid the model generator unit 116 and/or the event detector unit 120 in performing associated tasks. It may be noted that while the embodiment of FIG. 1 depicts the processor unit 122 as a separate unit, in certain embodiments, the model generator unit 116 and/or the event detector unit 120 may include a corresponding processor unit.

In addition, the memory unit 124 is communicatively coupled to the processor unit 122 and may be accessed by the model generator unit 116 and/or the event detector unit 120. In an exemplary embodiment, the memory unit 124 may include one or more memory modules. The memory unit 124 may be a non-transitory storage medium. For example, the memory may be a dynamic random access memory (DRAM) device, a static random access memory (SRAM) device, flash memory or other memory devices. In one embodiment, the memory may include a non-volatile memory or similar permanent storage device, media such as a hard disk drive, a floppy disk drive, a compact disc read only memory (CD-ROM) device, a digital versatile disc read only memory (DVD-ROM) device, a digital versatile disc random access memory (DVD-RAM) device, a digital versatile disc rewritable (DVD-RW) device, a flash memory device, or other non-volatile storage devices. In another embodiment, a non-transitory computer readable medium may be encoded with a program to instruct at least the processor unit 122 to perform functions of the model generator unit 116 and/or the event detector unit 120.

Figure 2A:
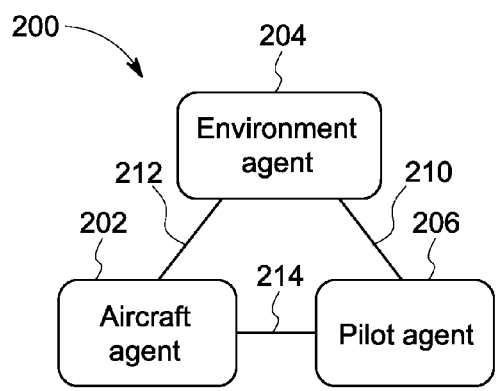
FIG. 2(a) illustrates a multi-agent model representative of the socio-technical system, in accordance with aspects of the present specification.

FIG. 2(a) illustrates one embodiment of a multi-agent model 200, in accordance with aspects of the present specification. As previously noted with reference to FIG. 1, the model generator unit 116 is configured to generate the multi-agent model. In one embodiment, the multi-agent model 200 includes a plurality of agents 202, 204, 206 and a plurality of interconnections 210, 212, 214. Further, in one embodiment, the multi-agent model 200 is associated with a plurality of situation awareness vectors. Each situation awareness (SA) vector corresponds to a relation between one agent with reference to another agent at a given time instant. The SA vector includes an identity element, a state element, intent element, and mode information. The identity element identifies an agent among the plurality of agents associated with the SA vector, while the state element is representative of a state of the agent. Also, the intent element provides information about the intent of other agents at a present instant of time and the mode information is indicative of behavior of the agent during operation.

In another embodiment, the multi-agent model 200 is a dynamic risk model (DRM). In the multi-agent dynamic risk model (MA-DRM), the one or more agents include deterministic components, stochastic components, static components, and dynamic components. It may be noted that the MA-DRM and one or more of its agents may be represented by a plurality of ordinary differential equations (ODEs) and stochastic differential equations (SDEs). In general, the MA-DRM is a model of a hybrid system represented by hybrid stochastic differential equations. In such an embodiment, a generalized stochastic hybrid process (GSHP) having both discrete and continuous stochastic processes may be used to represent MA-DRM and one or more of its agents. In this embodiment, at least one of the plurality of SA vectors is determined based on the plurality of SDEs representing the MA-DRM. In another embodiment, at least one of the plurality of SA vectors may be determined based on the plurality of ODEs representing the subsystems.

Furthermore, in certain embodiments, the multi-agent model 200 with the three agents 202, 204, 206 may be representative of the socio-technical system 102 of FIG. 1. As previously noted, the socio-technical system 102 is representative of operation of a transport aircraft. In this example, agent 202 is an aircraft agent representative of the aircraft subsystem 106. Also, the agent 204 is an environment agent representative of the environmental subsystem 104 and the agent 206 is a pilot agent representative of the pilot subsystem 108 of FIG. 1. In one example, the aircraft agent 206 is modelled as a point-mass aircraft model described by an SDE system of six variables. By way of example, the aircraft agent 206 is represented by equation (1) as:

$$\dot{y}=f(P,I_c,V_w,V_A,D,L) \qquad (1)$$

In equation (1), $f$ is a function, P is a 3-dimensional (3D) position of the aircraft, $I_c$ is a control input vector having components representative of engine thrust, angle of attack, and the bank angle, $V_w$ is a 3D wind stochastic vector, $V_A$ is mass of the aircraft, D is an aircraft drag function, and L is an aircraft lift function. The control input vector $I_c$ is determined by a hybrid feedback controller generated either in an automatic mode or based on pilot inputs.

In one embodiment, a plurality of elements of the control input vector $I_c$ is generated by a controller in an automatic mode. However, in certain other scenarios, the plurality of elements of the control input vector may be provided by the pilot. One example of such a scenario includes commanding an emergency maneuver of a full-thrust climb.

The environment agent 204 is communicatively coupled to the aircraft agent 202 and the pilot agent 206 and configured to simulate environmental effects encountered by the aircraft agent 202 during the flight. The environment agent 204 includes a mathematical model representative of terrain and atmosphere. A distance between the terrain and the aircraft is represented by a variable m. The environment agent 204 also includes the effects of a constant wind speed. Also, constant wind direction is uniformly distributed between 0 and $2\pi$. Intensity of the wind follows a truncated normal distribution with non-negative values having a mean of 10 knots and a standard deviation of 5 knots. In one embodiment, the environment agent 204 accounts for turbulence effects. Also, in some embodiments, a suitable turbulence model such as a Dryden turbulence model is used to account for the turbulence effects.

The pilot agent 206 is communicatively coupled to the environment agent 204 and the aircraft agent 202 and configured to detect an altimetry fault. The pilot agent 206 is further configured to initiate an avoidance maneuver based on the altimetry fault. The time taken by the pilot agent 206 for initiating the maneuver is represented by an exponential distribution with the mean parameter of 30 seconds.

Figure 2B:
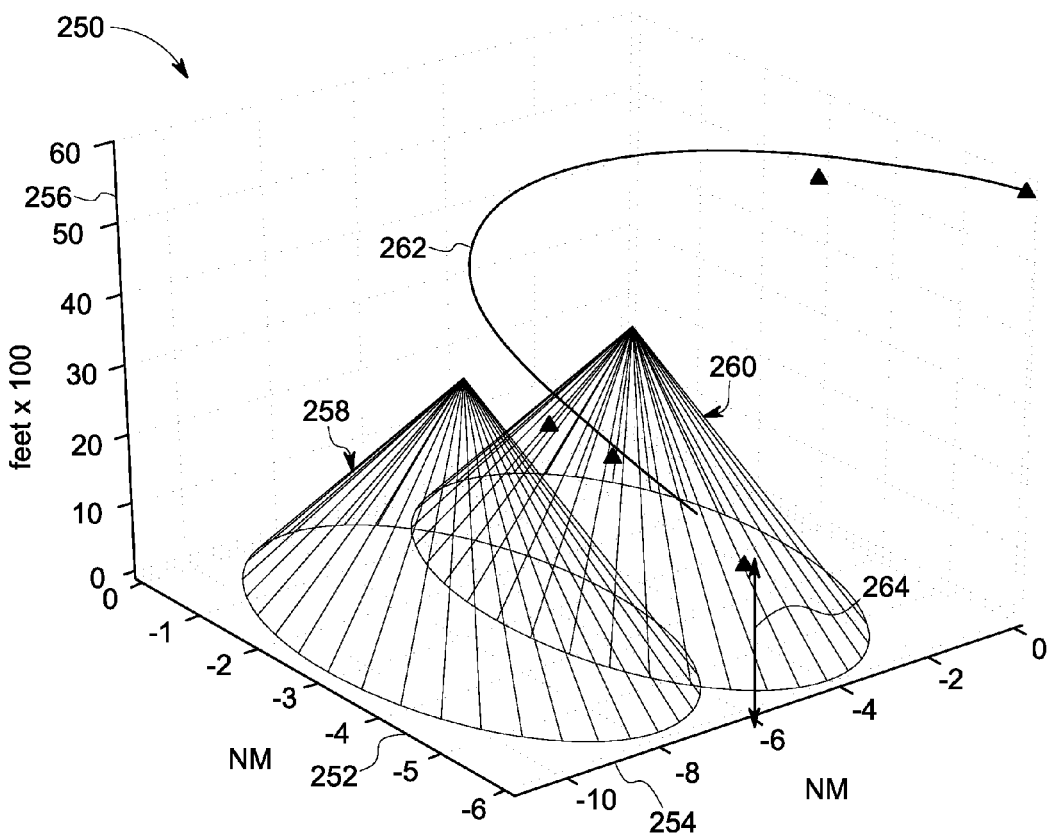
FIG. 2(b) illustrates a trajectory of a flight in an aircraft management system, in accordance with aspects of the present specification.

FIG. 2(b) illustrates an airspace bounding box 250 corresponding to the multi-agent model 200 of FIG. 2(a), in accordance with aspects of the present specification. The airspace bounding box 250 includes an x-axis 252 representative of distance in nautical miles, a y-axis 254 representative of distance in nautical miles, and a z-axis 256 representative of height in feet. The airspace bounding box 250 also includes two peaks of terrain 258, 260. The event detector unit 120 (see FIG. 1) instantiates a Monte Carlo simulation of the flight of the aircraft agent 202 having a programmed path represented by a curve 262. In the illustrated example, the peaks 258, 260 have a base radius of three nautical miles and an altitude of three thousand six hundred feet. The aircraft flight path 262 depicts an aircraft entering into the bounding box 250, descending and passing between the two peaks of terrain 258, 260. The Monte-Carlo simulation is continued until the aircraft goes out of the airspace bounding box 250, reaches a maximum simulated flight time T, or strikes the terrain. Reference numeral 264 is representative of a minimum distance $d_{min}$ between the terrain and the aircraft flight path 262. A zero value corresponding to $d_{min}$ is representative of an accident event. In the illustrated example of FIG. 2(b), the value of $d_{min}$ is 1354 ft.

Aircraft altimetry systems are generally used to provide height or altitude measurements during the flight. However, in some situations, the aircraft altimetry systems may generate faulty measurements due to various conditions such as icing, other types of sensor obstructions, computing error, and the like. Altimetry system faults manifest as an altitude error $\epsilon_a$, which in turn causes the aircraft to fly with an altitude offset $\epsilon_h$. If the fault is not detectable, this offset may be caused by the flight guidance system of the aircraft agent 202 due to the erroneous information. In one embodiment, the pilot agent 206 determines the altitude offset $\epsilon_h$ and compensates the altitude error in the flight guidance system of the aircraft agent 202. In certain embodiments, a contingency procedure/maneuver may be employed to ensure that the aircraft climbs steadily at maximum thrust for a determined period of time, thereby avoiding any collision with the terrain. The contingency procedure may be initiated either by the pilot pulling the yoke or via use of other control devices. Also, this contingency maneuver ensures that the aircraft climbs without stalling until the aircraft is situated at an altitude above the altitude of the peaks 258, 260. It may be noted that a rare event of aircraft accident may be said to occur when safeguards provided by various subsystems such as the altimetry system and the pilot agent are unable to rectify or minimize the altitude error.

In accordance with aspects of the present specification, simulations using the MA-DRM may be used to determine occurrence of an event of interest such as an accident due to altimetry system faults. In one embodiment, the event of interest is a flight instance having an accident or malfunction during the flight. Moreover, the event of interest may be represented as a plurality of regions in a parameter space defined by the MA-DRM. Accordingly, the parameter space of the MA-DRM is searched by varying one or more system variables using an optimization technique to determine the regions corresponding to the higher probability of the event of interest. In one embodiment, a Lipschitzian optimization technique is employed to perform the search of the parameter space. The Lipschitzian optimization technique uses a Lipschitz constant which is a bound on a rate of change of an objective function associated with the optimization technique.

In another embodiment, a sampling optimization technique such as a dividing rectangles technique (DIRECT) is employed to perform the search of the parameter space. Use of DIRECT entails partitioning the parameter space into hyperboxes with successively decreasing sizes. In an embodiment where the parameter space has one dimension, the hyperbox is an interval. However, when the parameter has two dimensions, the hyperbox is a rectangle. It may be noted that during the search operation, an objective function of the optimization is evaluated at the centroid of each of the hyperboxes. In one embodiment, the objective function of DIRECT is a mean of an evaluation of a distance function for a plurality of particles $\xi$ generated in that hyperbox. In one embodiment, a ratio of particles that are identified as being associated with occurrence of the failure event to the total number of particles generated by a Monte Carlo simulation may be determined. This ratio may be used in along with the objective function in order to assign the priority to hyperboxes in the interior of the target region. This embodiment of DIRECT having an objective function based on the mean distance function and the ratio may be generally referred to as the Outer-µ version of DIRECT. The technique of determining rare events of the socio-technical system and assessing the performance of such a system will be described in greater detail with reference to FIGS. 3-7.

Figure 3:
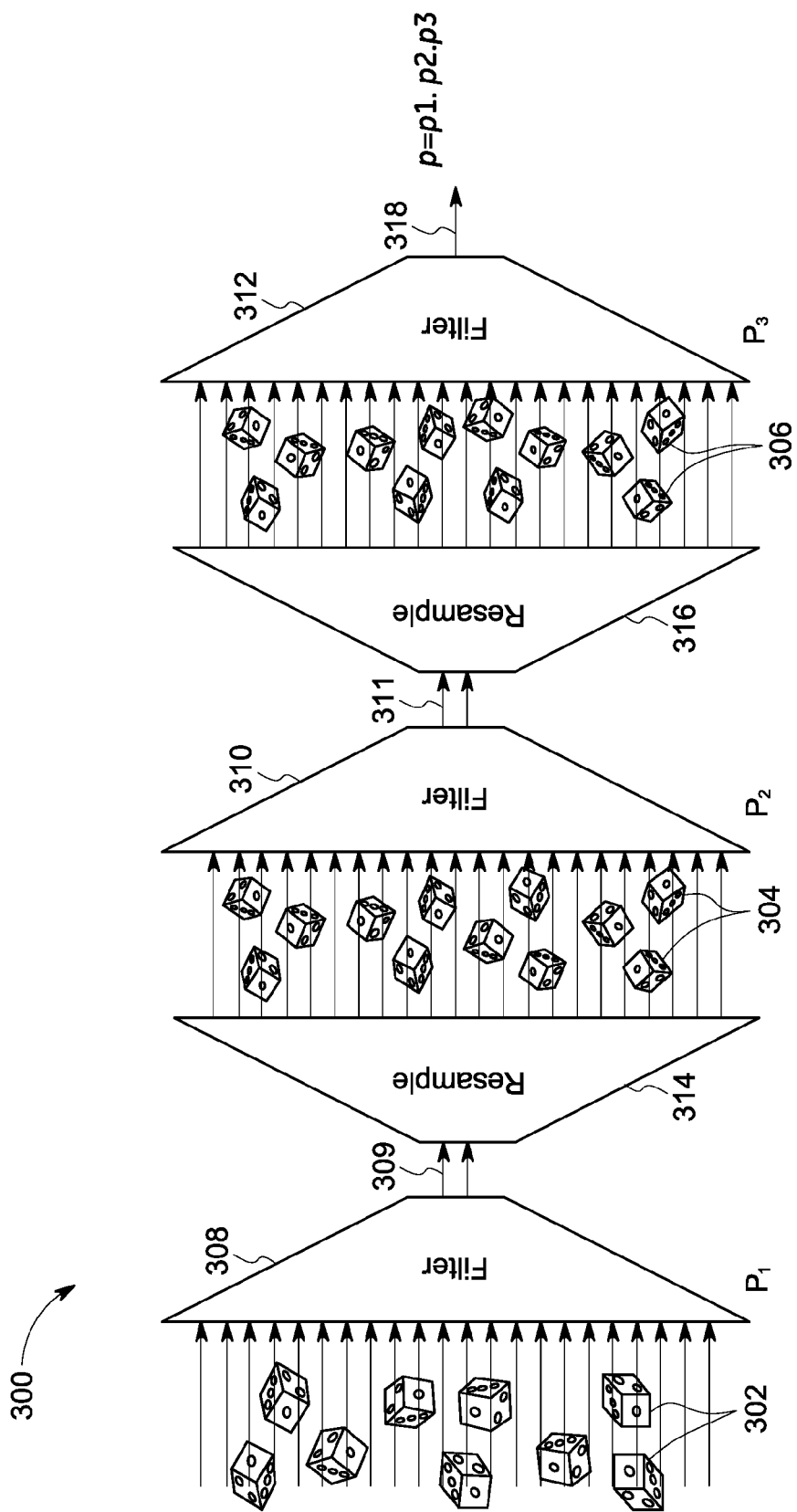
FIG. 3 illustrates a schematic of an Interacting Particle System (IPS) used for statistical simulation of a rare event, in accordance with aspects of the present specification.

FIG. 3 illustrates a schematic 300 of a particle filtering technique used for statistical simulation of an Interacting Particle System (IPS) representative of a socio-technical system such a flight system, in accordance with aspects of the present specification. The particle filtering is a numerical technique for determining probability distributions of IPS and estimating statistical parameters such as a rare event based on the probability distributions of the IPS. The particle filtering technique uses a plurality of filtering stages 308, 310, 312 and a plurality of resampling stages 314, 316. In the context of the particle filtering technique applied to a flight system, a plurality of trajectories that potentially include rare events is referred to as particles. In one embodiment, fourteen filtering stages are used in the IPS. Each of the plurality of filtering stages is characterized by a threshold distance. For example, a first filtering stage may be associated with a threshold distance of about thousand feet, while a second filtering stage may be associated with a threshold distance of about nine hundred feed. In one example, each successive stage has decreasing value of threshold distance. Moreover, in one example, the thirteenth filtering stage may have a threshold distance of about twenty five feet.

In the example of FIG. 3, a plurality of particles 302, representative of a universal set of particles, is provided to the first filtering stage 308. Also, a probabilistic weight is associated with each of the plurality of particles 302. In the example of an aircraft management system, all instances of the aircraft flights form the universal set of particles 302. At the first filtering stage 308, the particles 302 are evaluated and a subset of particles representative of events having reduced probability of occurrence of a rare event is selected. This subset of particles may also be referred to as 'surviving particles' 309.

In one embodiment, the surviving particles 309 from the first filtering stage 308 may not have desired statistical properties to be further processed at another stage. It may be noted that surviving particles that do not contribute to the desired statistical properties are referred to as 'degenerating particles' in the following stage. The degenerating particles exhibit a skewed probability distribution away from the desired distribution. In such an embodiment, a second filtering stage 310 is used to eliminate the degenerating particles using a quality criterion. In one embodiment, the statistical resampling technique replaces the degenerating particles with new particles having similar values for the probability weights. Furthermore, a first conditional probability $p_1$ for a surviving particle 309 at the first filtering stage 308 is determined based on the corresponding probabilistic weight. Reference numeral 304 is used to represent particles in the second filtering stage 310. These particles 304 include copies of the original surviving particles 309 from the first filtering stage 308 created via use of a resampling method in the resampling stage 314.

At the second filtering stage 310, the second-stage particles 304 along with corresponding probabilistic weights are available for continuing the statistical simulation. A second conditional probability is determined at the second filtering stage 310. Surviving particles 311 from the second filtering stage 310 represent a subset of particles representative of events having a reduced probability of occurrence of rare events based on properties of the second filtering stage 310. The second conditional probability $p_2$ for the surviving particles 311 of the second filtering stage 310 is determined based on their corresponding probabilistic weights.

The following resampling stage 316 performs statistical resampling of the surviving particles 311 from the second filtering stage 310 to generate particles 306 of a third filtering stage 312. In a similar fashion, a third conditional probability $p_3$ is determined at the third filtering stage 312. The first, second and third conditional probabilities ($p_1$, $p_2$, $p_3$) are partial probabilities of a net conditional probability value 318. In the example of FIG. 3 that includes three filtering stages, a net conditional probability 318 of a rare event is determined as the product of the first, second, and third conditional probabilities $p_1$, $p_2$, $p_3$.

In the context of a particle filtering technique, a probabilistic search space is defined as a succession of regions (nested regions) having a sequence of filtering distances. Each region among the succession of regions is termed as a 'stage' and is associated with a corresponding stopping time parameter. The innermost among the nested regions may be referred to as a target region. Mathematically, the probability search space is a filtration of σ-algebras of outcomes. In particular, a σ-algebra is a set for which countably infinite operations are defined over its subsets. Further, filtration is mathematically equivalent to causality inherent in physical systems ensuring equivalence of sample points of the probability space with real life events such as events associated with the flight of an aircraft.

In one embodiment, an aircraft flight instance is represented as a particle $\xi$ in the particle filtering technique. Function $d(\xi, t)$ is representative of a distance between the aircraft and the terrain at a particular instant of time t. The particle $\xi$ is used to instantiate a plurality of values of τ that corresponds to instants when the function $d(\xi, \tau)$ has a plurality of distance values denoted by m, during the entire course of simulated flight instance. It may be noted that the number of filtering stages is defined based on the values of m for the particle $\xi$. The first filtering stage 308 is associated with a higher value of m and the subsequent stages are associated with smaller values of m. In one example, the first filtering stage 308 is associated with a distance $m_1$, a second stage is associated with a distance $m_2$, and a third stage is associated with a distance $m_3$, where the values of $m_2$ and $m_3$ are less than the value of $m_1$, and the value of $m_3$ is less than the value of $m_2$.

At the end of the first filtering stage 308, if the value of $d(\xi, t) < m_1$, the particle $\xi$ survives the first filtering stage 308 and is a candidate particle for the second filtering stage 304. As used herein, 'survival' refers to a decreasing distance between the aircraft and the terrain that is lower than $m_1$ at the end of first filtering stage 308. In another example, at the end of the second filtering stage 310, if the value of $d(\xi, t) < m_2$, the particle $\xi$ survives the second filtering stage 310 and is a candidate particle for the third filtering stage 312. At the end of the flight simulation, a surviving particle represents a rare event having $d(\xi, t) \sim 0$. Alternatively, the flight simulation is terminated when the value of t is equal to maximum value of time T.

A probability of a particle reaching a stage is defined as a fraction of particles surviving from a previous stage. The probability of a particle surviving a stage is determined based on a probabilistic weight associated with the particle. Also, a probability of particles surviving at the end of the simulation is representative of a rare event. In accordance with aspects of the present specification, a method for enhancing the performance of IPS based optimization is presented. In particular, the performance of the IPS based optimization is enhanced by combining the particle filtering technique with a sampling optimization technique.

Figure 4:
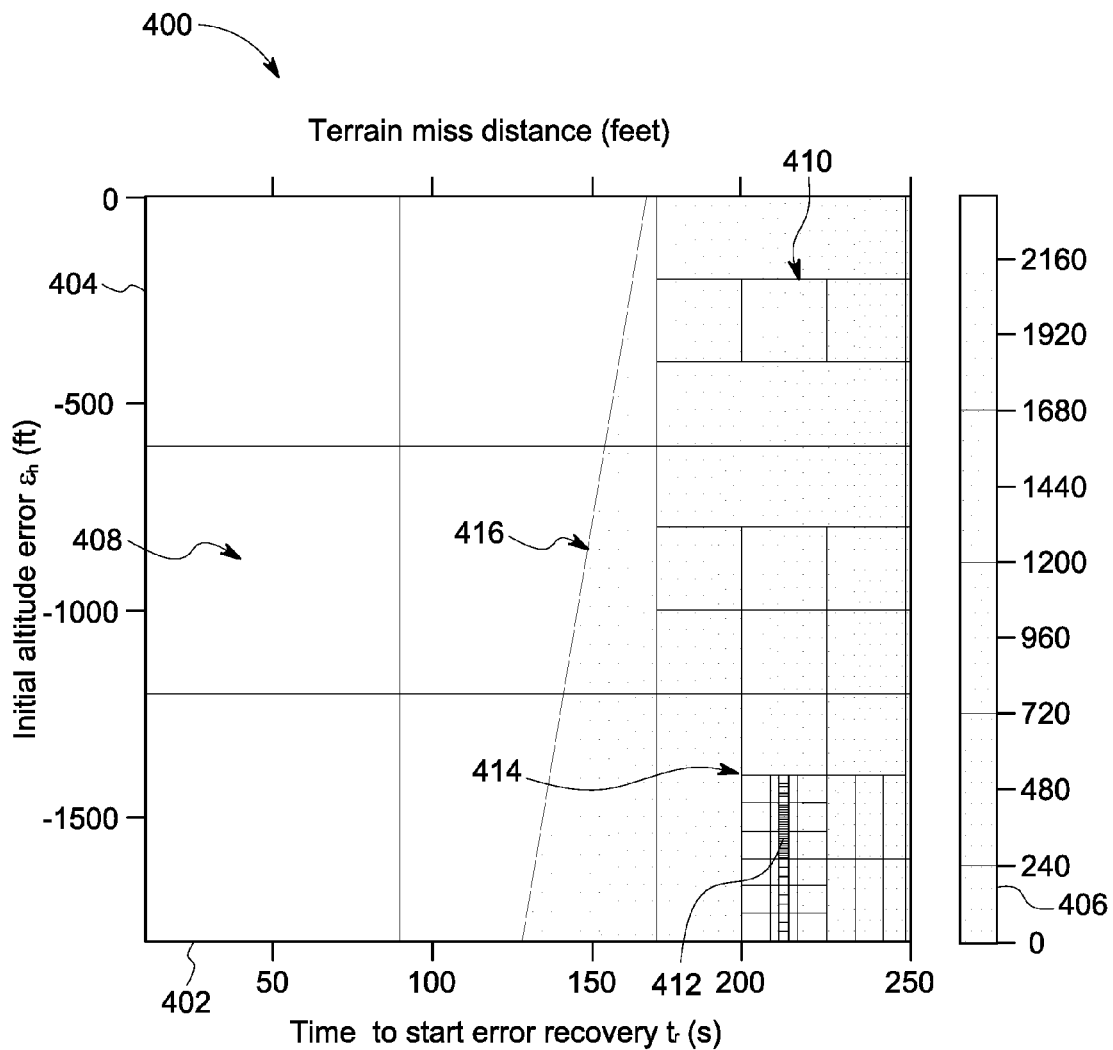
FIG. 4 is an illustration of search rectangles generated via use of a Dividing Rectangles technique for determining a rare event, in accordance with aspects of the present specification.

FIG. 4 is diagrammatical representation 400 of search rectangles generated via use of a Dividing Rectangles technique (DIRECT) of optimization for determining a rare event, in accordance with aspects of the present specification. DIRECT is one example of a general purpose optimization technique. In accordance with aspects of the present specification, DIRECT is employed as a sampling optimization technique for determining a sub-region that includes a point representative of the rare event. In general, more than one sub-region may be determined and each sub-region may have more than one point representative of the rare event. The diagrammatical representation 400 includes a first axis 402 representative of time of initiating error recovery in an estimate of altitude with units in seconds, a second axis 404 representative of an initial altitude error in feet, and a third axis 406 representative of a minimum distance of the flight path from the terrain in feet. In particular, the diagrammatical representation 400 represents a search space corresponding to a time of error recovery $t_r$ and an initial altitude error $\epsilon_h$. It may be noted that in certain embodiments, the time of error recovery $t_r$ is constrained to an interval in a range from about 10 seconds to about 250 seconds, while the initial altitude error $\epsilon_h$ may be constrained to an interval in a range from about −1800 feet to about 0 foot.

As depicted in FIG. 4, the diagrammatical representation 400 includes a plurality of rectangles 408, 410, 412 of different sizes. The plurality of rectangles 408, 410, 412 is generated via use of DIRECT. In particular, the search space is partitioned based on an evaluation of an objective function used for optimization. Further, although the example of FIG. 4 is described with reference to use of DIRECT as the sampling optimization technique, use of other sampling optimization techniques is also envisaged.

The objective function is based on a terrain miss distance and is denoted as d(x). During optimization, the partitioning of the search space is performed with the goal of finding a value of the objective function less than or equal to a predefined distance value of m. A point 414 on the diagrammatical representation 400 represents a collision condition due to a combination of error recovery delays and initial altitude error values. Each evaluation of the objective function in DIRECT corresponds to a centroid of a rectangle. In particular, DIRECT partitions the search space into smaller rectangles 412 in regions where the evaluations of the objective function provide smaller numerical values. Furthermore, the diagrammatical representation 400 includes a contour plot 416 representative of a region of interest where a finer division of rectangles is desired. In one embodiment, the contour plot 416 may be generated based on about one thousand evaluations of the objective function. Accordingly, DIRECT performs fewer evaluations in regions that are away from the contour plot 416, thereby resulting in a larger rectangle 408, and relatively larger number of evaluations in the region of the contour plot 416, thereby resulting in a smaller rectangle 410.

In the example illustrated in FIG. 4, the search space is a two-dimensional (2D) space. Hence, the 2D search space is partitioned into a plurality of rectangles. In an embodiment where the search space is a one-dimensional (1D) space, the search space may be partitioned into a plurality of intervals. Similarly, for a three-dimensional (3D) search space, the search space is a cuboid partitioned into 3D regions. In general, for an n-dimensional search space, the search space may be partitioned into a plurality of hyperboxes. The search is directed based on an evaluation of the objective function at a centroid of each of the hyperboxes. It may be noted that the search space may be representative of the largest hyperbox and the successively partitioned hyperboxes form a dense subset of the largest hyperbox.

In one embodiment, DIRECT may be modified to improve optimization performance. In particular, the objective function of DIRECT may be modified to enhance the optimization of DIRECT. In one example, the objective function is modified to perform the search homogenously within the target region. The modified objective function $d_\lambda(x)$ may be configured to generate a value $\lambda > m$ at points where the function $d(x) \leq m$. The modified objective function decreases the priority of unimportant hyperboxes at some areas of the target region and partitions other areas such as the borders of the target region. The modified objective function is configured to postpone the nested subdivision of neighboring hyperboxes with equal values of the objective function. Additionally, the modified objective function is configured to partition the hyperboxes with different values of the objective function to different extents while searching for the rare event. The modified DIRECT is referred to as a DIRECT Outer-$\lambda$ and associated convergence criteria of the modified DIRECT may be referred to as outer convergence criteria.

In another embodiment, the objective function of DIRECT Outer-$\lambda$ may be further modified to prevent the partitioning of internal points of the target region by another criterion. In one example, the modified objective function may be represented as:

$$d^\lambda_k(x) = d^\lambda(x) + v(k,x) \qquad (2)$$

where v is indicative of the distance to the border of the target region, k is indicative of a time index of the subdivision of the hyperbox centered at x, and $\lambda$ is an arbitrated distance between the terrain and the aircraft at time k.

The modified objective function of equation (2) is configured to assign intermediate priorities among the rectangles in the target region. When a hyperbox is partitioned for the first time, time index k may be assigned an initial value of zero (0) and the value of the objective function is $\lambda$. For subsequent partitioning of the same hyperbox, the objective function includes a non-zero component $v(k, x)$ that is indicative of internality of the point x with respect to the target region. In one embodiment, the term $v(k, x)$ is directly proportional to the number of rectangles that are inside the border of the target region and are adjacent to the rectangle corresponding to the point x. The optimization technique using the modified outer convergence criteria may be referred to as DIRECT Outer-v optimization.

In another embodiment, the search using DIRECT is performed inside the border of the target region using a different criterion. The objective function of DIRECT is modified to include a probability density function of a point in the target region. The modified objective function is represented as:

$$f(x) = \begin{cases} d(x) & \text{if } d(x) > m \\ -g(x) & \text{if } d(x) \leq m \end{cases} \qquad (3)$$

where d(x) is a distance function, g(x) is a probability density function for the point x, and m is a distance parameter.

In one embodiment, a modified optimization technique is formulated based on such an objective function. The modified objective function has two components. A first component of the modified objective function provides a higher value for unimportant hyperboxes to reduce the priority of the unimportant hyperboxes for further division. Also, a second component of the modified objective function is representative of a negative value of a probability density function of a point in the sample space. The first component provides an objective function for efficiently searching outside the target region, while the second component provides an objective function for efficiently searching within the target region. In one embodiment, the second component is modified to accommodate an empirically evaluated probability $\rho$ of a particle reaching an input of a filtering stage. The modified objective function for $d(x) \leq m$ is $-g(x)\rho$. This technique may be referred to as DIRECT Inner-$\rho$. A convergence criteria associated with DIRECT Inner-$\rho$ is referred to as inner convergence criterion.

In one embodiment, DIRECT uses DIRECT Outer-$\lambda$ technique or DIRECT Outer-v and the search is performed based on an outer convergence criteria. In another embodiment, DIRECT Inner-$\rho$ is employed and the search is performed based on an inner convergence criteria. The sampling optimization technique may be based on the outer convergence criteria, the inner convergence criteria, or a combination thereof.

Figure 5:
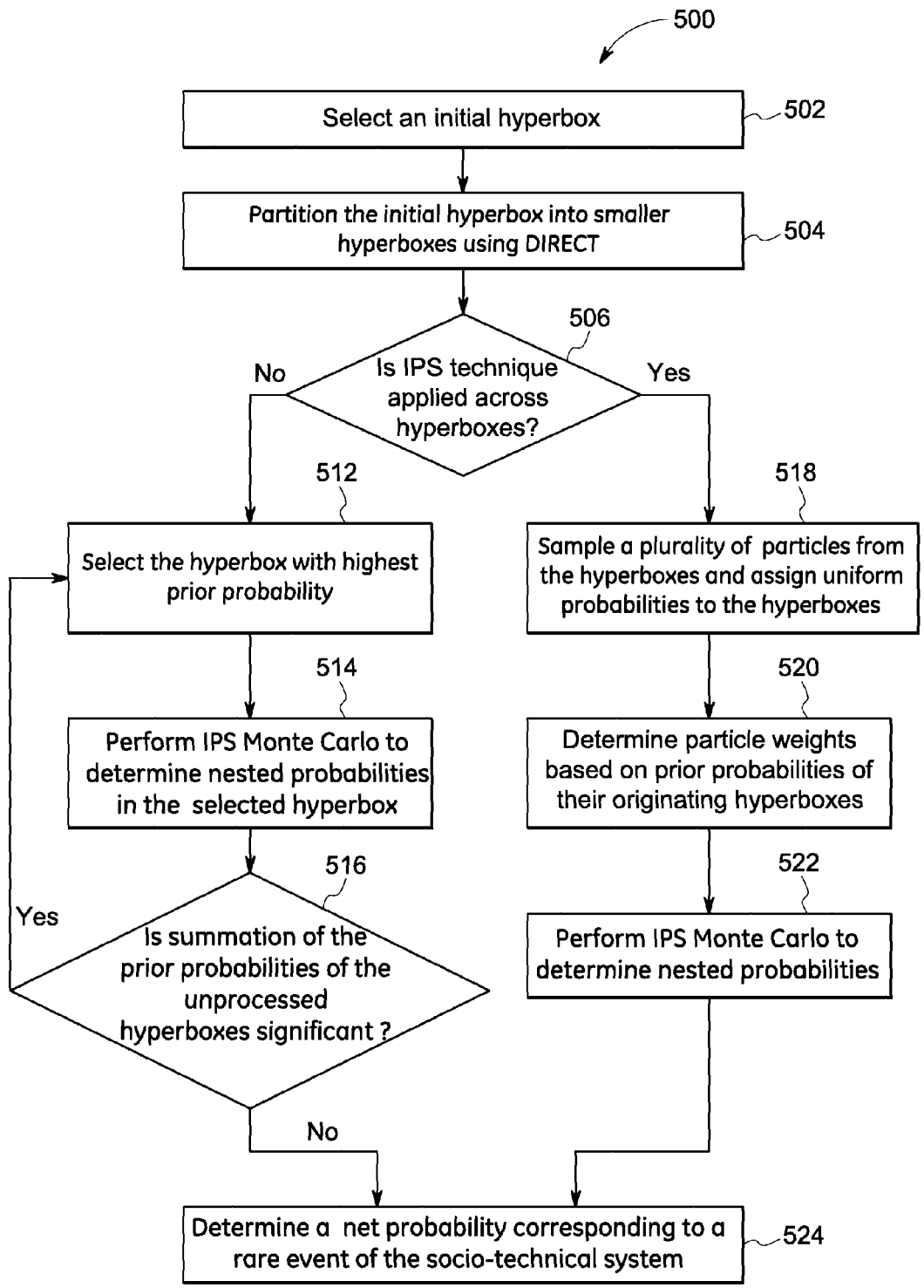
FIG. 5 illustrates a flow chart illustrating a Dividing Rectangles Interacting Particle System (DIPS) technique, in accordance with aspects of the present specification.

FIG. 5 is a flow chart 500 of a Dividing Interacting Particle System (DIPS) technique, in accordance with aspects of the present specification. It may be noted that a sequential Monte Carlo technique for this example is referred to as an Interacting Particle System (IPS) technique. In accordance with aspects of the present specification, the Dividing-rectangles Interacting particle System (DIPS) technique is an optimization technique that is derived by combining DIRECT and the IPS based technique. The method of FIG. 5 is described with reference to the components of FIGS. 1-4.

An initial hyperbox representative of an optimization search space is selected by the event detector unit 120, as indicated by step 502. In one example, an altitude error follows a normal distribution with mean zero and standard deviation of one hundred feet, but with a limited search range from about thousand eight hundred feet to about zero feet, time elapsed before fault detection is exponentially distributed with mean parameter $\mu$ of thirty seconds, with search restricted in a range from about ten seconds to about eight hundred and ten seconds, wind direction is uniformly distributed in a range from zero to $2\pi$ radians, and a wind intensity having a normal distribution (with a mean of ten knots and variance of five knots, truncated to retain only non-negative values) in a range from about zero knots to about eighty knots.

At step 504, a DIRECT optimization is used to determine a plurality of smaller hyperboxes. In particular, the initial hyperbox is partitioned into the plurality of smaller hyperboxes based via use of DIRECT optimization. DIRECT is a deterministic global optimization technique. More, specifically, DIRECT is a modification of a Lipschitzian optimization technique that does not require knowledge about the Lipschitz constant. Additionally at step 504, prior probabilities corresponding to the plurality of smaller hyperboxes are determined.

It may be noted that DIRECT incrementally partitions a multivariate search space represented by the initial hyperbox selected at step 502 into the plurality of smaller hyperboxes. In one example, the initial hyperbox is partitioned into sixteen thousand seven hundred hyperboxes. The size corresponding to successive hyperboxes decreases as the search approaches a target region where the objective function of DIRECT has a minimum value. In one embodiment, when DIRECT is used to determine a failure event in an aircraft operation system, the objective function may be representative of a distance between the terrain and the aircraft in a set of trajectory simulations. The objective function is determined based on a vector value for the essential system parameters. It may be noted that the DIPS technique may also use other sampling optimization techniques.

An objective function used in the DIPS technique is selected based on a configuration choice decision. Accordingly, at step 506, a configuration choice selected by a user is verified. In one example, at step 506, a check may be carried out to verify if the user selection entails applying the IPS technique across the plurality of hyperboxes. If the user selection does not entail applying the IPS technique across the hyperboxes, then control is passed on to step 512.

Furthermore, at step 512, the hyperbox with a highest prior probability is selected. The prior probability of a hyperbox is indicative of a probability of occurrence of the rare event within the hyperbox. In one embodiment, at step 512, the hyperboxes are arranged in a sequential order based on the associated prior probabilities. Additionally, the hyperbox with the highest probability is selected for further processing. The remaining hyperboxes may be referred to as unprocessed hyperboxes. Step 512 is performed iteratively on one of the remaining unprocessed hyperboxes till a significance criteria is reached Moreover, at step 514, IPS Monte Carlo simulations are performed to determine nested probabilities in the selected hyperbox. In addition, a partial sum of nested probabilities weighted by corresponding prior probabilities is determined. Further, an upper bound is determined as a summation of the prior probabilities of the unprocessed hyperboxes. At step 516, the upper bound is tested for statistical significance with reference to the partial sum. If the upper bound is statistically significant, control is passed on to step 512. However, if the upper bound is not statistically significant, control is passed on to step 524.

Referring again to step 506, if it is determined that the user selection is to apply IPS technique across the hyperboxes, then control is passed on to step 518. Furthermore, at step 518, a plurality of particles is sampled from the set of hyperboxes and uniform probabilities are assigned to the hyperboxes. In one embodiment, one thousand particles are generated in each hyperbox.

At step 520, a particle weight is determined for each of the plurality of particles. In one embodiment, the particle weight corresponding to the particles within a hyperbox is equivalent to the prior probability of the hyperbox. The term 'prior probability' refers to a probability associated with a hyperbox and is representative of a probability of the system parameter values to be associated with that hyperbox. Moreover, at step 522, IPS Monte Carlo simulations are performed based on the plurality of particles to determine nested probabilities. Control is passed on to step 524.

Subsequently, at step 524, a net probability corresponding to a rare event in a socio-technical system is determined based on the plurality of probability weights and nested probabilities. The net probability corresponds to the probability of the rare event determined by the DIPS technique.

In one embodiment, an IPS technique is used for optimizing an objective function in a probabilistic search space associated with a socio-technical system having a large number of variables characterized by hybrid stochastic differential equations (SDEs). In some embodiments, the socio-technical system such as an aircraft operation system includes a Dryden turbulence model. The Dryden turbulence model represents linear and angular velocity components of air gusts as position-dependent stochastic processes. In such embodiments, the aircraft operation system is a generalized stochastic Hybrid process (GSHP) having a Markov property.

Figure 6:
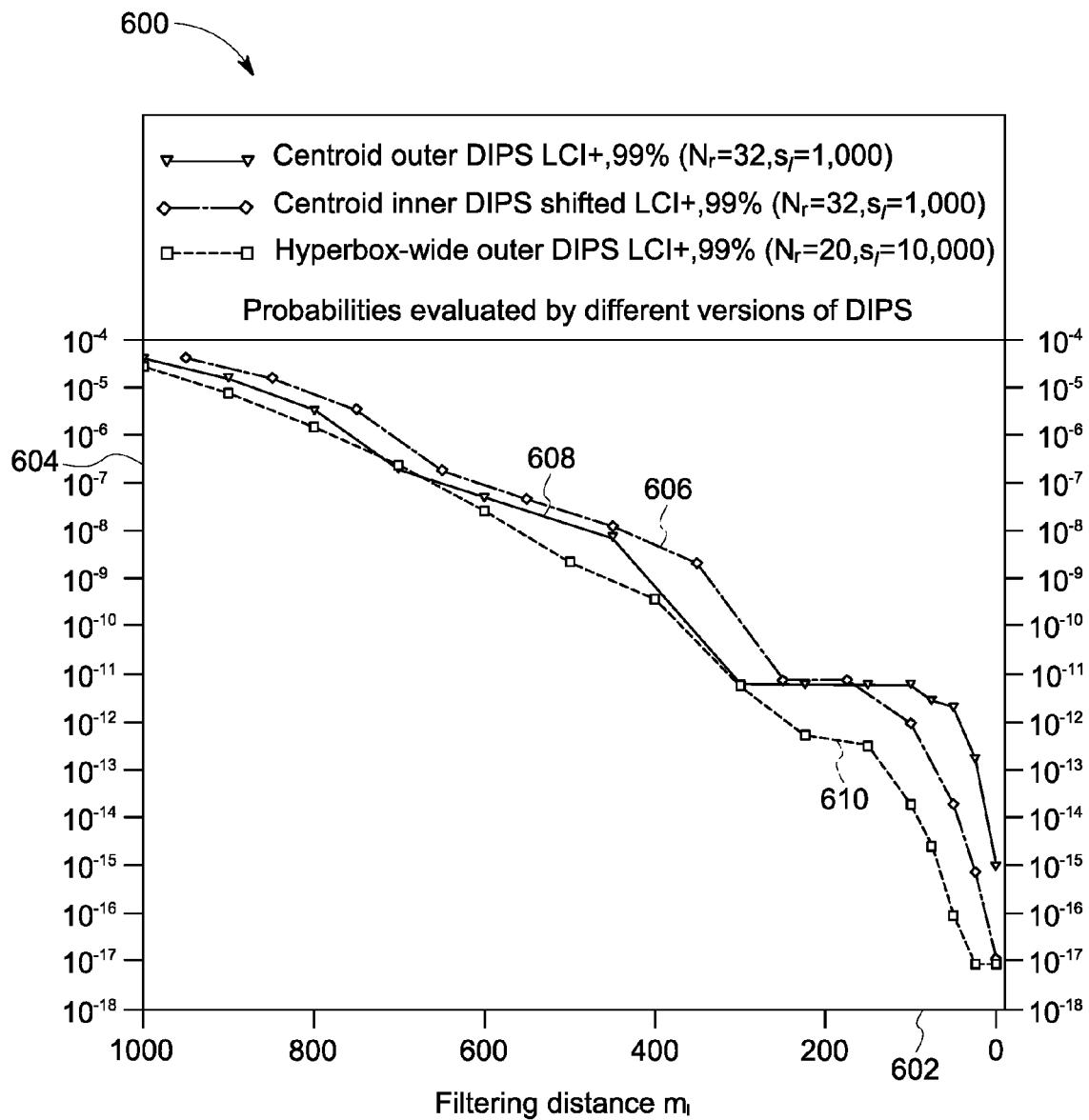
FIG. 6 is a graphical illustration of probability curves corresponding to the DIPS technique of FIG. 5, in accordance with aspects of the present specification.

FIG. 6 is a graphical representation 600 of probability curves corresponding to different versions of the DIPS technique, in accordance with aspects of the present specification. The graph 600 includes an x-axis 602 representative of a filtering distance and a y-axis 604 representative of a probability of a rare event evaluated by different versions of the DIPS technique. The graphical representation 600 includes three curves 606, 608, 610 corresponding to three versions of the DIPS technique. The curve 606 corresponds to a DIPS technique with an outer convergence criterion, while the curve 608 corresponds to a DIPS technique with an inner convergence criterion. The curves 606, 608 correspond to reuse of particles positioned at the centroids of hyperboxes of DIRECT. The curve 610 corresponds to a DIPS technique with a hyperbox-wide implementation. In this version of the DIPS technique, particles positioned at the centroids of the hyperboxes of DIRECT are discarded and new particles are generated at random places inside each hyperbox. Different versions of DIPS technique are simulated for thirty two instances ($N_r$) using one thousand particles in each of the filtering stages ($s_1$). The curves 606, 608, 610 reach probability values in a range from $10^{-15}$ to about $10^{-17}$. It may be observed that the exemplary DIPS technique is capable of identifying a rare event having a low probability value of $10^{-15}$, whereas the conventional IPS based techniques are able to detect events having probabilities upto $10^{-10}$. The ability of DIPS technique to determine smaller values of probability corresponding to the rare events facilitates enhanced design of high performing socio-technical systems.

Figure 7:
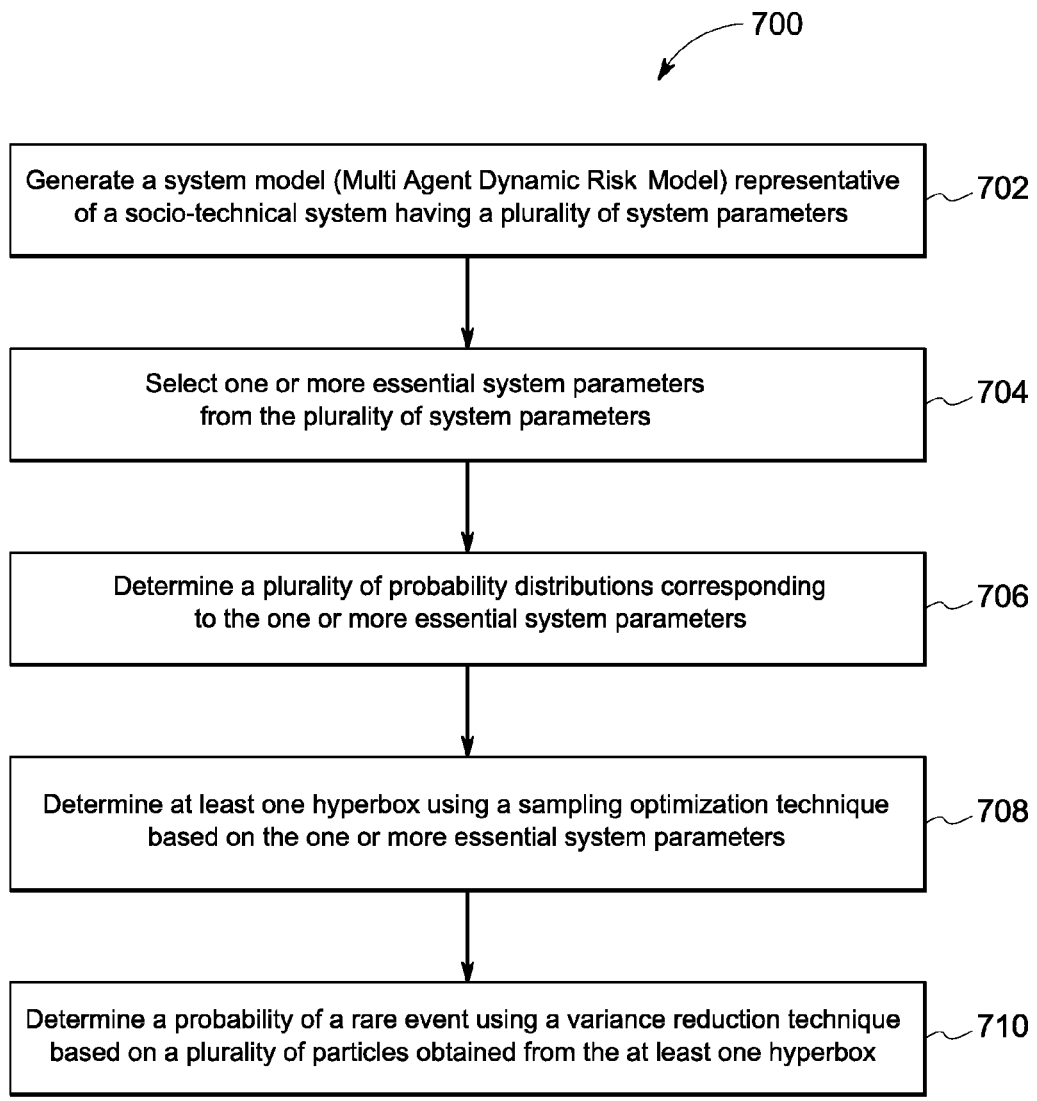
FIG. 7 is a flow chart of a method for detecting a rare event in a complex socio-technical system, in accordance with aspects of the present specification.

FIG. 7 is a flow chart 700 of a method for detecting a rare event in a socio-technical system, in accordance with aspects of the present specification. The method 700 includes generating a system model as indicated by step 702. In one embodiment, a multi-agent dynamic risk model (MA-DRM) is used as a system model representative of the socio-technical system, where the MA-DRM has a plurality of system parameters. At step 704, one or more essential system parameters may be selected from the plurality of system parameters. Furthermore, a plurality of probability distributions corresponding to the one or more essential system parameters is determined, as depicted by step 706.

Also, at step 708, the method includes determining a hyperbox using a sampling optimization technique based on one or more essential system parameters. One example of such a technique is described with reference to FIG. 5. In one embodiment, DIRECT is used as a sampling optimization technique. DIRECT evaluates an objective function and partitions the search space into a plurality of hyperboxes based on the evaluation. In a 1D search space, the hyperbox is representative of a simple interval. Also, in a 2D search space, the hyperbox is representative of a rectangle and in a 3D search space, the hyperbox is representative of a cuboid.

The objective function may be modified to enhance the convergence rate of DIRECT. In one embodiment, the objective function is modified based on an outer convergence criterion. In another embodiment, the objective function is modified based on an inner convergence criterion. Also, at step 710, a probability of a rare event is determined using a variance reduction technique based on a plurality of particles obtained from the at least one hyperbox. In one embodiment, an interacting particle system is used to determine the probability of the rare event. A plurality of probabilities is determined corresponding to a plurality of nested hyperboxes using the IPS technique such as the technique described with reference to FIG. 3.

Further, in one embodiment, a plurality of moments of the probability distributions corresponding to the one or more essential system parameters is determined. A plurality of confidence intervals corresponding to the plurality of moments is also determined. One or more limit values are used to recalculate the prior probability of the hyperboxes obtained by DIRECT. A sensitivity analysis is performed based on the new prior probability values to determine the variation of the rare event probability obtained at step 710 to the variation of the moments of the probability distributions.

In an exemplary embodiment, DIRECT may be combined with the interacting particle system to generate a Dividing Rectangles Interacting particles System (DIPS) technique. The DIPS technique is used to explore the search space. A hyperbox having an optimized solution is identified by a sampling optimization technique such as DIRECT. Subsequently, a conditional probability corresponding to the rare failure event is determined based on a variance reduction technique. In one embodiment, the probability of the rare event is determined based on a plurality of nested probabilities corresponding to a plurality of hyperboxes within a larger hyperbox. In another embodiment, the probability of the rare event is determined based on a plurality of nested probabilities across a plurality of hyperboxes within a larger hyperbox. It may be noted that the variance reduction may also be performed using other techniques such as a quantum computing based optimization technique. In another embodiment, the variance reduction is performed by a combination of the IPS technique and the quantum computing based technique.

The systems and methods disclosed hereinabove provide a technique for the enhanced detection of rare failure events in socio-technical systems. By way of example, while the conventional systems are capable of detecting rare events having probability values of $10^{-10}$, the systems and methods of the present specification are configured to detect rare events having probability values below $10^{-15}$. Furthermore, use of the systems and methods described hereinabove provides enhanced performance analysis and risk assessment in the socio-technical system design.

Those skilled in the art will recognize that the systems and techniques described herein may be embodied or carried out in a manner that achieves or improves one advantage or group of advantages as taught herein without necessarily achieving other objects or advantages as may be taught or suggested herein.

While the technology has been described in detail in connection with only a limited number of embodiments, it should be readily understood that the specification is not limited to such disclosed embodiments. Rather, the technology can be modified to incorporate any number of variations, alterations, substitutions or equivalent arrangements not heretofore described, but which are commensurate with the spirit and scope of the claims. Additionally, while various embodiments of the technology have been described, it is to be understood that aspects of the specification may include only some of the described embodiments. Accordingly, the specification is not to be seen as limited by the foregoing description, but is only limited by the scope of the appended claims.

The invention claimed is:

1. A method, comprising:
generating, via a model generator unit, a system model representative of a socio-technical system having a plurality of system parameters;
selecting, via the model generator unit, one or more essential system parameters from the plurality of system parameters;
determining, via the model generator unit, a plurality of probability distributions corresponding to the one or more essential system parameters;
determining, via an event detector unit, at least one hyperbox using a sampling optimization technique that employs a modified objective function configured to decrease priority of unimportant regions of a search space, based on the one or more essential system parameters, wherein the at least one hyperbox is representative of a confidence region corresponding to a rare event of the socio-technical system; and
determining, via the event detector unit, a probability of the rare event using a variance reduction technique based on a plurality of particles obtained from the at least one hyperbox, wherein the probability of the rare event is representative of a performance of the socio-technical system.

2. The method of claim 1, wherein the socio-technical system comprises a complex stochastic system having human and technological components.

3. The method of claim 1, wherein the system model comprises at least one of a multi-agent dynamic risk model and a plurality of hybrid stochastic differential equations.

4. The method of claim 1, wherein the plurality of probability distributions comprises one or more generalized stochastic hybrid processes.

5. The method of claim 1, wherein the sampling optimization technique is based on an outer convergence criterion, an inner convergence criterion, or a combination thereof.

6. The method of claim 1, wherein determining the probability of the rare event comprises determining a plurality of nested probabilities corresponding to a plurality of hyperboxes.

7. The method of claim 1, wherein determining the probability of the rare event comprises determining a plurality of nested probabilities across a plurality of hyperboxes.

8. The method of claim 1, wherein the variance reduction technique is an interacting particle system technique, a quantum computing based optimization technique, or a combination thereof.

9. The method of claim 1, wherein the sampling optimization technique is a dividing rectangles technique.

10. A rare event detection system, the system comprising:
a model generator unit configured to:
generate a system model representative of a socio-technical system, wherein the system model comprises a plurality of system parameters;
select one or more essential system parameters from the plurality of system parameters;
determine a plurality of probability distributions corresponding to the one or more essential system parameters;
an event detector unit communicatively coupled to the model generator unit and configured to:
determine at least one hyperbox using a sampling optimization technique that employs a modified objective function configured to decrease priority of unimportant regions of a search space, based on the one or more essential system parameters, wherein the hyperbox is representative of a confidence region corresponding to a rare event of the socio-technical system; and determine a probability of the rare event using a variance reduction technique based on a plurality of particles obtained from the at least one hyperbox, wherein the probability of a rare event is statistically significant and is representative of a performance of the socio-technical system.

11. The system of claim 10, wherein the socio-technical model comprises a complex stochastic system having human and technological components.

12. The system of claim 10, wherein the model generator unit is further configured to generate a multi-agent dynamic risk model.

13. The system of claim 10, wherein the model generator unit is further configured to determine a plurality of hybrid differential equations corresponding to a plurality of subsystems of the socio-technical system.

14. The system of claim 10, wherein the model generator unit is further configured to represent the system model as a generalized stochastic hybrid process.

15. The system of claim 10, wherein the event detector unit is further configured to perform the sampling optimization technique based on an outer convergence criterion, an inner convergence criterion, or a combination thereof.

16. The system of claim 10, wherein the event detector unit is configured to determine a plurality of nested probabilities corresponding to a plurality of hyperboxes.

17. The system of claim 10, wherein the event detector unit is further configured to determine a plurality of nested probabilities across a plurality of hyperboxes.

18. The system of claim 10, wherein the event detector unit is configured to determine the probability of the rare event based on an interacting particle system technique, a quantum computing based optimization technique, or a combination thereof.

19. A non-transitory computer readable medium that stores instructions executable by one or more processors to perform a method for detecting a rare event, comprising:

generate a system model representative of a socio-technical system, wherein the system model comprises a plurality of system parameters;

select one or more essential system parameters from the plurality of system parameters;

determine a plurality of probability distributions corresponding to the one or more essential system parameters;

determine at least one hyperbox using a sampling optimization technique that employs a modified objective function configured to decrease priority of unimportant regions of a search space, based on the one or more essential system parameters, wherein the at least one hyperbox is representative of a confidence region corresponding to a rare event of the socio-technical system; and determine a probability of the rare event using a variance reduction technique based on a plurality of particles obtained from the at least one hyperbox, wherein the probability of a rare event is statistically significant and representative of performance of the socio-technical system.

* * * * *